(12) United States Patent
Shimizu et al.

(10) Patent No.: US 7,615,878 B2
(45) Date of Patent: Nov. 10, 2009

(54) COGENERATION APPARATUS

(75) Inventors: Motohiro Shimizu, Saitama (JP);
Toshimitsu Takaishi, Saitama (JP);
Hiroyuki Eguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 187 days.

(21) Appl. No.: 11/575,342

(22) PCT Filed: Aug. 19, 2005

(86) PCT No.: PCT/JP2005/015137

§ 371 (c)(1),
(2), (4) Date: Mar. 15, 2007

(87) PCT Pub. No.: WO2006/030603

PCT Pub. Date: Mar. 23, 2006

(65) Prior Publication Data

US 2007/0251469 A1 Nov. 1, 2007

(30) Foreign Application Priority Data

Sep. 17, 2004 (JP) .............................. 2004-271878

(51) Int. Cl.
| | | |
|---|---|---|
| H02K 23/52 | (2006.01) | |
| B60L 1/02 | (2006.01) | |
| F01K 15/00 | (2006.01) | |
| F01K 17/02 | (2006.01) | |
| F02C 6/00 | (2006.01) | |
| F02C 6/18 | (2006.01) | |

(52) U.S. Cl. ............................................. 290/10; 290/2
(58) Field of Classification Search ...................... 290/2, 290/10
See application file for complete search history.

(56) References Cited

U.S. PATENT DOCUMENTS 4,024,704 A * 5/1977 Hudson ...................... 60/39.25

(Continued)

FOREIGN PATENT DOCUMENTS

JP 04-10302 B2 2/1992

(Continued)

OTHER PUBLICATIONS

International Search Report of PCT/JP2005/015137, date of mailing Nov. 15, 2005.

(Continued)

*Primary Examiner*—Nicholas Ponomarenko
*Assistant Examiner*—Pedro J Cuevas
(74) *Attorney, Agent, or Firm*—Westerman, Hattori, Daniels & Adrian, LLP

(57) ABSTRACT

A cogeneration system that is operated in system connection is disconnected from the system and operated independently at a power failure of the system. A power generator 1 driven by an engine E is connected to a system 9. A water-cooling device 13 recovers exhaust heat of the engine E. When an operating switch 20 is switched, to its independent operation mode for an independent operation apart from the system 9, the upper limit of the target rotation speed Ntgt of an electronic governor 16 is increased over that at system connection operation, thereby the engine speed can be increased, and the maximum output point of the power generator 1 is increased for operation. When a power failure of the system 9 is detected by a power failure detecting unit 21, an operation mode judging unit 19 outputs a judgment result similar to that at the moment when the independent operation mode is instructed and increases the upper limit of the target engine speed Ntgt, and turns off a connection switch 7 to disconnect the system connection.

3 Claims, 4 Drawing Sheets

U.S. PATENT DOCUMENTS

| | | | | |
|---|---|---|---|---|
| 4,578,944 | A * | 4/1986 | Martens et al. | 60/39.182 |
| 4,604,714 | A * | 8/1986 | Putman et al. | 700/288 |
| 4,628,462 | A * | 12/1986 | Putman | 700/288 |
| 4,752,697 | A * | 6/1988 | Lyons et al. | 290/2 |
| 4,802,100 | A * | 1/1989 | Aasen et al. | 700/288 |
| 5,311,062 | A * | 5/1994 | Farkas | 290/4 R |
| 5,434,454 | A * | 7/1995 | Farkas | 290/4 R |
| 5,536,976 | A * | 7/1996 | Churchill | 307/11 |
| 5,903,060 | A * | 5/1999 | Norton | 290/2 |
| 6,404,075 | B1 * | 6/2002 | Potter et al. | 307/64 |
| 6,435,420 | B1 * | 8/2002 | Kasai et al. | 237/12.1 |
| 6,825,575 | B1 * | 11/2004 | Edelson | 290/40 C |
| 6,894,403 | B2 * | 5/2005 | Shinogi | 290/40 R |
| 7,045,913 | B2 * | 5/2006 | Ebrahim et al. | 290/52 |
| 7,078,825 | B2 * | 7/2006 | Ebrahim et al. | 290/52 |
| 7,239,034 | B2 * | 7/2007 | Gehret, Jr. | 290/40 B |
| 2002/0109411 | A1 * | 8/2002 | Potter et al. | 307/64 |
| 2004/0008010 | A1 * | 1/2004 | Ebrahim et al. | 322/44 |
| 2004/0164559 | A1 * | 8/2004 | Shinogi | 290/40 B |
| 2005/0116474 | A1 * | 6/2005 | Edelson | 290/40 A |
| 2005/0206167 | A1 * | 9/2005 | Gehret, Jr. | 290/2 |
| 2006/0066113 | A1 * | 3/2006 | Ebrahim et al. | 290/52 |
| 2006/0071554 | A1 * | 4/2006 | McNamara et al. | 307/10.1 |
| 2006/0202559 | A1 * | 9/2006 | Hashimoto et al. | 307/64 |
| 2006/0259200 | A1 * | 11/2006 | Choi et al. | 700/287 |
| 2006/0266030 | A1 * | 11/2006 | Solomon et al. | 60/508 |
| 2008/0018175 | A1 * | 1/2008 | McNamara et al. | 307/84 |
| 2008/0238108 | A1 * | 10/2008 | Edelson et al. | 290/40 C |
| 2009/0025917 | A1 * | 1/2009 | Gauthier et al. | 165/157 |
| 2009/0139556 | A1 * | 6/2009 | Bell et al. | 136/201 |
| 2009/0151342 | A1 * | 6/2009 | Major | 60/320 |

FOREIGN PATENT DOCUMENTS

| | | |
|---|---|---|
| JP | 2000-87801 A | 3/2000 |
| JP | 2000-297963 A | 10/2000 |
| JP | 2002-70606 A | 3/2002 |
| JP | 2004-80945 A | 3/2004 |
| JP | 2005-264850 A | 9/2005 |

OTHER PUBLICATIONS

Translation of International Preliminary Report on Patentability mailed Mar. 29, 2007 of International Application No. PCT/JP2005/015137.

* cited by examiner

COGENERATION APPARATUS

TECHNICAL FIELD

The present invention relates to a cogeneration apparatus which generates electric power and supplies hot-water by using an engine such as a gas engine as a power source using city gas as fuel and, more particularly, to a cogeneration apparatus which can be independently operated in an emergency such as electric failure in a commercial electric power system linked with an electric power generation output.

BACKGROUND ART

In recent years, necessity of global environment conservation is widely known, and a cogeneration apparatus serving as a privately-owned electrical power facility which performs electric power generation, hot-water supply, and the like by using an engine, as a power source, such as a gas engine using city gas or the like as fuel attracts attention. In the cogeneration apparatus of this type, a heat output generated by electric power generation cannot be often simultaneously consumed. From the viewpoint that energy is used without waste, a heat-demand-priority type apparatus which does not generate an amount of heat which cannot be consumed is proposed. For example, a cogeneration apparatus described in Japanese Patent Application Laid-open No. 2000-87801 has an electric power generation output linked with a commercial electric power system, receives electric power supply from the system in case of no heat load, and operates only when a heat request is made to improve operating efficiency. Japanese Patent Application Laid-open No. 2000-297963 proposes a heat-demand-priority type apparatus which further includes a hot-water supply tank as a buffer for heat output and heat demand and which temporarily accumulates an amount of heat as hot water in the hot-water supply tank when the heat output and the heat demand are not equal to each other. According to this apparatus, an amount of heat can be used through hot water depending on heat demand when the cogeneration apparatus does not operate to make it possible in order to reduce waste of heat energy.

Patent Document 1: JP 2000-087801 A
Patent Document 2: JP 2000-297963 A

DISCLOSURE OF THE INVENTION

Problem to be Solved by the Invention

The conventional cogeneration apparatus described in the above Patent Documents is become been used as a compact cogeneration apparatus for household purposes in recent years. In view of system linkage, the cogeneration apparatus generally stops its operation not to singularly operate the cogeneration apparatus in electricity failure in the system, that is, not to operate the cogeneration apparatus independently. However, in this case, it is disadvantageous that the cogeneration apparatus serving as an electrical power facility which is been owned with difficulty cannot be used in an emergency such as electric failure. Therefore, the present inventors discuss to release the linkage which is linked with the system to independently operate the cogeneration apparatus. However, as described above, since an output specification is determined such that a compact cogeneration apparatus for household purposes is based on linkage with a system not to waste electric generation power, output shortage to a household load is disadvantageously predicted in independent operation.

The present invention has as its object to provide a cogeneration apparatus which can supply large electric generation energy to a household load in state of emergency such as electricity failure.

Means for Solving the Problem

As a first characteristic feature of the present invention, in a cogeneration apparatus having an engine, an electric power generator driven by the engine, a system linkage control unit which links an electric power generation output from the electric power generator with a power system, and an exhaust heat recovery unit which recovers exhaust heat from the engine, in an independent operation mode in which an operation is performed independently of the power system, an upper limit of a rotating speed of the engine is raised to an upper limit higher than that in a system linkage state to make it possible to perform an operation at a raised maximum output point of the electric generation.

As a second characteristic feature of the present invention, in electricity failure in the power system, a mode is switched to the independently operation mode, and the system linkage is canceled.

As a third characteristic feature of the present invention, the engine is started when an operation of the engine is unoperated in electricity failure in the system.

Effect of the Invention

According to the present invention having the above characteristic features, for example, when the cogeneration apparatus is disconnected from the system due to electricity failure and operated in the independent operation mode, the cogeneration apparatus can be operated at a rotating speed higher than that in a system linkage state. For this reason, even in a compact cogeneration apparatus for household purposes, the capability of the cogeneration apparatus can be fully derived to obtain a high output. Therefore, even though electric power is not temporarily supplied from the system side, the cogeneration apparatus can cope with a load increase, and, after recovery from the electricity failure, the cogeneration apparatus can return to a system linkage operation performed at a relative low rotating speed/low load in preference to lifetime and economical efficiency.

In an unoperated state of the engine, since the cogeneration apparatus is brought into operation in the independent operation mode immediately after occurrence of electricity failure in the power system, a lifeline can be extremely effectively assured in state of emergency.

DESCRIPTION OF REFERENCE NUMERALS

E . . . Engine, 1 . . . Electric generator, 3 . . . Inverter, 6 . . . Mode switch, 7 . . . System switch, 8 . . . ATS, 9 . . . System, 13 . . . Water-cooling apparatus, 15 . . . Hot-water tank, 16 . . . Electron governor, 19 . . . Operation mode discriminating unit, 20 . . . Operation switch

BEST MODE FOR CARRYING OUT THE INVENTION

Figure 2:
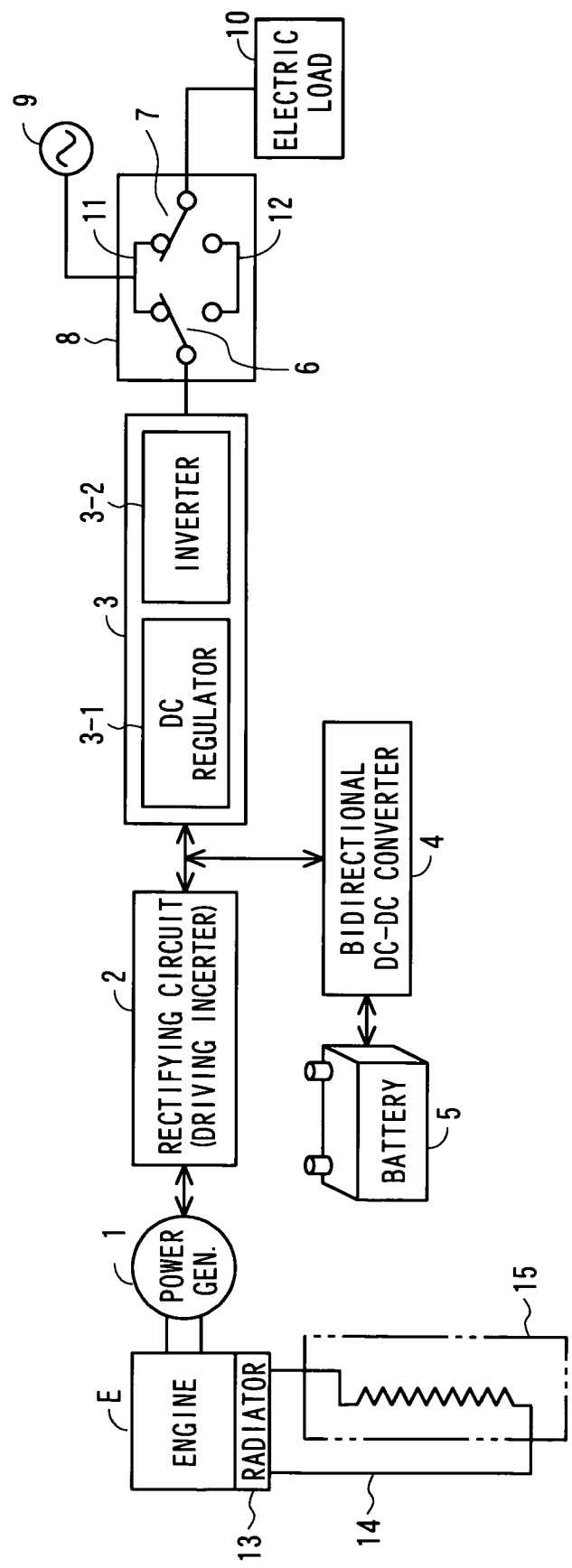
FIG. 2 is a block diagram showing a configuration of a cogeneration apparatus according to an embodiment of the present invention.

An embodiment of the present invention will be described below in detail with reference to the accompanying diagrams. FIG. 2 is a block diagram showing a configuration of a cogeneration apparatus in which an engine-driven type electric generator is linked with a commercial electric power system. In FIG. 2, an electric generator 1 is a tripolar multipole magnetic engine-driven type generator in which a rotor is driven by an engine E and which generates an AC power depending on an engine rotating speed. The electric generator 1 is an electric generator also serving as an electric motor which can be operated as an engine starter motor. An engine E is, for example, a gas engine using city gas as a fuel and includes an electron governor which converges a rotating speed of the engine to a target rotating speed.

A rectifying circuit 2 has a bridge-connected rectifying element (not shown) to full-wave-rectify an output from the electric generator 1. Switching elements (not shown) such as FETs is connected to the rectifying element in parallel to each other. These switching elements are controlled to drive the electric generator 1 as an electric motor for starting the engine E. Depending on an ON/OFF state of the switching element of the rectifying circuit 2, a DC voltage applied from a battery 5 through a bidirectional DC-DC converter 4 is converted into a tripolar AC voltage to make it possible to supply the AC voltage to the electric generator 1. More specifically, the rectifying circuit 2 has a function as a driving inverter for an electric motor.

An inverter 3 has a DC regulator (switching converter) 3-1 and an inverter 3-2 and converts an output of the rectifying circuit 2 into an AC power having a predetermined frequency to output the AC power. The switching converter 3-1 has a function that prevents a fluctuation in output of the electric generator 1 or the battery 5 from adversely affecting an input voltage to the inverter 3-2. The inverter 3-2 has a function that converts an output AC current from the electric generator 1 into an AC current having the same quality (related to a voltage, a frequency, noise, and the like) as that of a power system 9 and is linked with the power system 9 in phase synchronization with the power system 9. An example of an electric power converter having a system linkage function is disclosed Japanese Patent Application Publication No. 4-10302.

An output from the inverter 3-2 is linked with the commercial electric power system 9 through a switching device (ATS) 8 constituted by switches 6 and 7 which switch one of a linkage operation and an independent operation to the other, and is connected to an electric load 10.

When the electric generator 1 is linked with the power system 9, the switch 7 is switched to a line 11 side. When the electric generator 1 is operated in the independent operation mode independently of the power system 9, the switch 7 is switched to a line 12 side. When the electric generator 1 is operated in linkage with the system 9, the switch 6 is switched to the line 11 side. When the electric generator 1 is operated in the independent operation mode independently of the power system 9, the switch 6 is switched to the line 12 side.

The battery 5 is an external DC current source which supplies an auxiliary electric power to a DC current source operated by an electric power from the electric generator 1 as needed. As a means to boost a voltage of the battery 5, the booster type bidirectional DC-DC converter 4 is connected to the output side of the rectifying circuit 2, that is, the input side of the inverter 3. The bidirectional DC-DC converter 4 has a function that electrically charges the battery 5 by an output from the rectifying circuit 2 when an output from the electric generator 1 is sufficient and when residual quantity of the battery 5 is small. In the following description, the battery 5 side of the bidirectional DC-DC converter 4 and the rectifying circuit 2 side of the bidirectional DC-DC converter 4 may be designated a primary side and a secondary side, respectively. The battery 5 is a 12 volts-output battery which is generally used as a power supply of an engine starter motor.

In the engine E, a water-cooling apparatus (radiator) 13 serving as an exhaust heat recovery unit which recovers exhaust heat from the engine E is provided, and a pipe line 14 for cooling water circulating in the water-cooling apparatus 13 is arranged to pass through the hot-water tank 15. The engine E generates heat with the operation thereof. The heat is recovered by heat exchange performed by the water-cooling apparatus 13 of the engine E to supply the heat to the hot-water tank 15. Heat recovery from the engine E preferably targets all high-temperature parts such as a muffler of the engine E.

An operation of the cogeneration apparatus will be described below. The bidirectional DC-DC converter 4 is driven by the same drive signal such that the primary side and the secondary side are perfectly synchronized with each other. According to the drive form, the bidirectional DC-DC converter 4 bidirectionally converts powers.

For starting the engine, on the basis of a relative voltage difference between the primary side and the secondary side obtained by a winding ratio of transformers of the bidirectional DC-DC converter 4, a DC voltage of the battery 5 is boosted by the bidirectional DC-DC converter 4, and the boosted DC voltage is given to the driving inverter (rectifying circuit) 2. The driving inverter 2 converts the DC voltage into a tripolar AC voltage to give the tripolar AC voltage to the electric generator 1, so that the electric generator 1 is started as an engine starter motor.

After the engine E is started, the electric generator 1 is driven by the engine, and a switching operation of the rectifying circuit 2 is stopped. An output from the electric generator 1 is rectified by the rectifying circuit (driving inverter) 2, adjusted in voltage by the switching converter 3-1 of the inverter 3, converted into an AC power having a predetermined frequency by the inverter 3-2.

When the residual quantity of the battery 5 is small, the battery 5 is electrically charged an output from the rectifying circuit 2 through the bidirectional DC-DC converter 4. More specifically, a converted output from the battery 5 is lower than an output voltage from the rectifying circuit 2, on the basis of the relative voltage difference between the primary side and the secondary side obtained by the winding ratio of the transformers of the bidirectional DC-DC converter 4, power conversion is performed to electrically charge the battery 5 by the output from the rectifying circuit 2.

This cogeneration apparatus can be operated as an emergency power supply in the independent operation mode. In the operation of the independent operation mode, the cogeneration apparatus cannot receive an electric power supplied from the power system 9. Therefore, when the cogeneration apparatus is operated in the independent operation mode not to cause shortage of output to the load as much as possible, the upper limit of the rotating speed of the engine E is enabled to be raised in comparison with the upper limit in the linkage state, so that the cogeneration apparatus can be operated while keeping a maximum output point of the electric generator 1 high.

Figure 1:
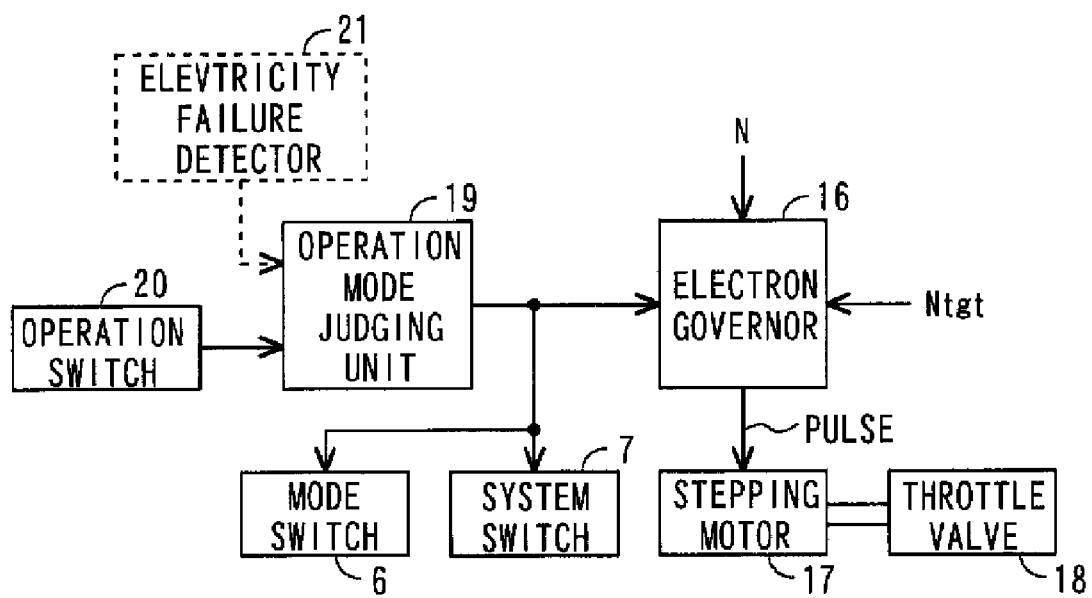
FIG. 1 is a block diagram showing main-part functions of a cogeneration apparatus according to an embodiment of the present invention.
Figure 3:
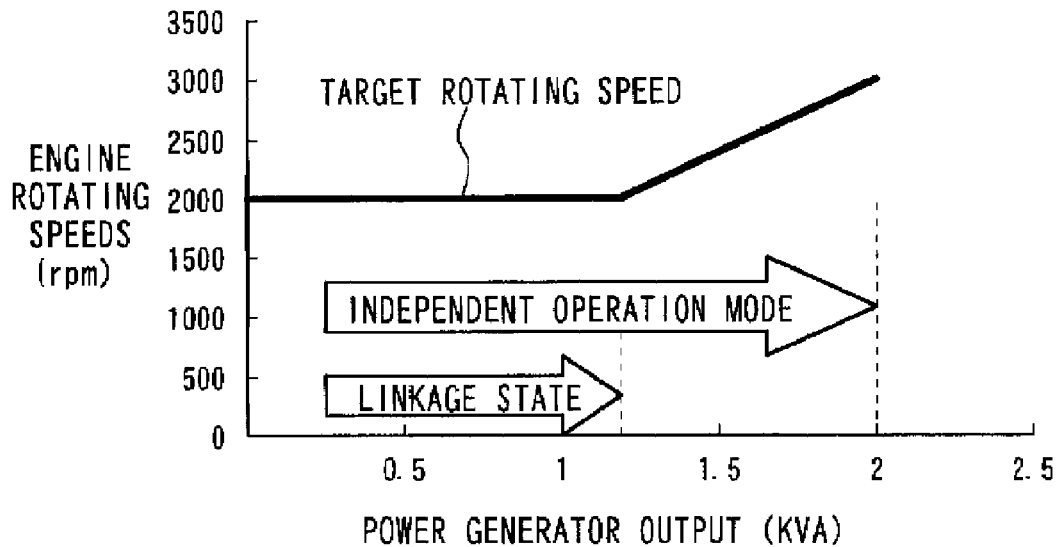
FIG. 3 is a graph showing upper limits of maximum output points in an independent operation mode and in a system linkage state.
Figure 4:
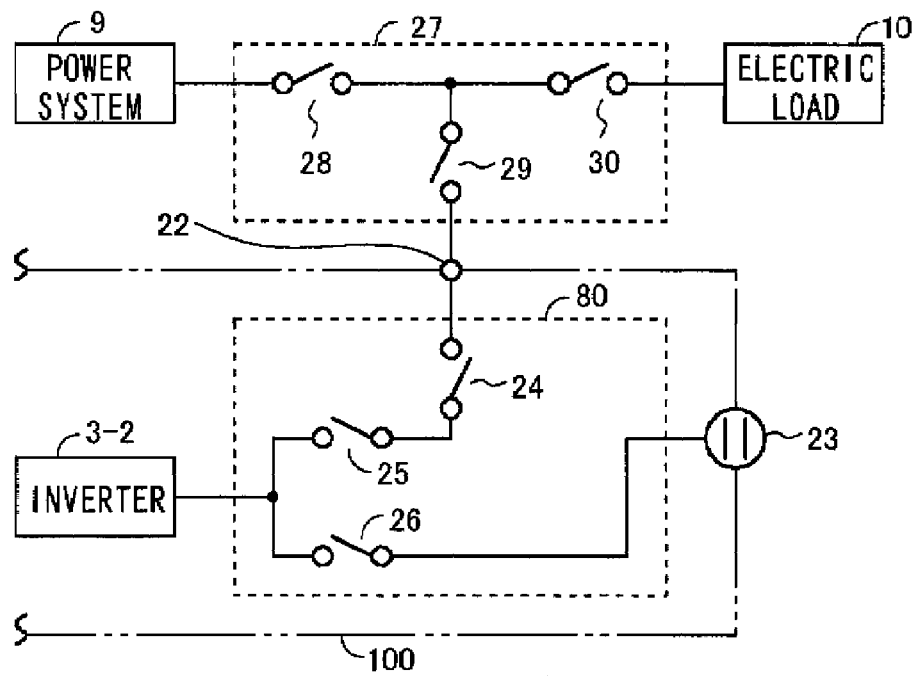
FIG. 4 is a single-line diagram of an electric output extracting unit of a cogeneration apparatus according to an embodiment of the present invention.

FIG. 1 is a block diagram showing main-part functions of a cogeneration apparatus according to an embodiment of the present invention. In FIGS. 2-4, the electron governor 16 controls a throttle valve operating such that the rotating speed of the electric generator 1, that is, a rotating speed N of the engine E is converged to a target rotating speed Ntgt. The electron governor 16 supplies a pulse signal corresponding to a difference between the rotating speed N and the target rotating speed Ntgt to a stepping motor 17 which drives a throttle valve 18. The target rotating speed Ntgt is controlled to 2000 rpm when the cogeneration apparatus is linked with the power system 9. When a current supplied to the electric load 10 increases, an output from the inverter 3-2 is adjusted to cope with the load. When the load further increases, the power system 9 supplies power for compensating the shortage of electric power.

In contrast to this, in the independent operation mode, since the cogeneration apparatus cannot receive an electric power from the power system 9, it is supposed that the cogeneration apparatus cannot cope with a large electric load by only output adjustment of the inverter 3-2. Therefore, the upper limit value of the target rotating speed Ntgt is raised to a value higher than the upper limit value in the system linkage state. When the electric load increases to cause shortage of output at the set maximum rotating speed of 2000 rpm in the system linkage state, the target rotating speed Ntgt is increased depending on the load. For example, the upper-limit value is set to make it possible to increase the target rotating speed Ntgt to 3000 rpm. For example, by the fact that a duty ratio of a switching element constituting the inverter 3-2 is larger than a predetermined value, it can be determined that control of the inverter 3-2 may not be able to cope with the load.

The operation mode discriminating unit 19 discriminates an operation mode depending on a selection signal input from an operation switch 20 arranged in the electric generator 1. When it is determined that the independent operation mode is selected, the upper limit value of the target rotating speed Ntgt is switched to an upper limit value for the independent operation mode.

The operation mode discriminating unit 19 switches both the switches 6 and 7 to the line 11 side when the cogeneration apparatus is linked with the power system 9, and switches both the switches 6 and 7 to the line 12 side in the independent operation mode. The mode switches 6 and 7 are switched to disconnect the electric generator 1 from the power system 9.

With the above configuration, for example, an engine start switch is arranged. When the switch is switched to designate the engine E to be started, the engine E can be operated in a setting in which the maximum output point of the electric generator 1 is made high.

Not only the configuration in which the operation switch 20 is arranged to make it possible to select the independent operation mode and the linkage operation, but also a configuration in which the independent operation mode and the linkage operation can be selected by an external remote control signal may be used. When a electricity failure detector 21 is provided to detect electricity failure in the power system 9, if the engine E stops, the engine E is automatically started to enable to operate the cogeneration apparatus in the independent operation mode.

A well-known electricity failure detector can be used as the electricity failure detector 21. For example, the electricity failure can be determined depending on the presence/absence of a phase jump of the power system 9. An output voltage and an output frequency of the electric generator 1 are monitored. In addition, in abnormality in which the output voltage and the output frequency depart from predetermined values, as in electricity failure, the operation may be switched to the operation performed in the independent operation mode. In relation to the detection of electricity failure, the detection of abnormality, and the disconnection from the commercial electric power system, for example a technique described in Japanese Patent Application Laid-open No. 2002-70606 can be used.

FIG. 3 is a graph showing variable domains of engine rotating speeds in the independent operation mode and in the linkage state. As shown in FIG. 3, in the linkage state, the upper limit of the target rotating speed Ntgt is fixed to 2000 rpm. In the independent operation mode, the upper limit value of the target rotating speed Ntgt is designed to be changed to 3000 rpm. Accordingly, in the independent operation state, the target rotating speed Ntgt may be continuously changed to 3000 rpm according to the electric load. As shown in FIG. 3, since the upper limit of the engine rotating speed N is fixed in the linkage state, the upper limit of the output is regulated to 1.2 KVA, and the engine rotating speed N can be increased with an increase of the target rotating speed Ntgt of the rotating speed N in the independent operation mode. An output of up to 2.0 KVA can be used as the maximum output.

FIG. 4 is a single-line diagram of a cogeneration apparatus, a system, and an electric load according to an example obtained by modifying the ATS 8 in FIG. 2 such that an electric power can be supplied to a load through an independent output terminal in the independent operation. In FIG. 4, a linkage switch 25 and an independent switch 26 correspond to the switch 6 (FIG. 2). An ATS 80 of a cogeneration apparatus 100 includes a linkage output terminal 22 serving as a first output terminal and an independent output terminal 23 serving as a second output terminal. The independent output terminal 23 can work as an outlet arranged on a frame of the cogeneration apparatus 100. The linkage output terminal 22 is connected to the inverter 3-2 through an independent interlock switch 24 constituted by electromagnetic contacts and the linkage switch 25 connected in series with the switch 24. The independent output terminal 23 is connected to the inverter 3-2 through the independent switch 26 constituted by electromagnetic contacts.

A distribution panel 27 has a main circuit breaker 28, a circuit breaker 29 dedicated to the cogeneration apparatus, and a switch 30 dedicated to the load. The linkage output terminal 22 of the cogeneration apparatus 100 is connected to the electric load 10 through the circuit breaker 29 dedicated to the cogeneration apparatus and the switch 30 for the load, and connected to the power system 9 through the circuit breaker 29 dedicated to the cogeneration apparatus and the main circuit breaker 28. The power system 9 is connected to the electric load 10 through the main circuit breaker 28 and the switch 30 for the load.

The main circuit breaker 28 and the circuit breaker 29 dedicated to the cogeneration apparatus 100 in the distribution panel 27 are switching means which detects an overcurrent to disconnect the cogeneration apparatus 100 from the power system 9.

In the ATS 80, in the system linkage state, the linkage switch 25 is turned on, and the independent switch 26 is turned off. Therefore, in the system linkage state, an output power of the electric generator 1 is supplied to the electric load 10 through the linkage switch 25, the circuit breaker 29 on the distribution panel 27, and the switch 30 for the load. An electric power from the power system 9 is supplied to the electric load 10 through the main circuit breaker 28 and the switch 30 for the load.

When the cogeneration apparatus 100 is operated in the independent operation mode, the independent switch 26 is turned on, and the linkage switch 25 is turned off. Therefore, in the independent operation mode, a voltage obtained by the electric generator 1 is output to the independent output terminal 23 through the independent switch 26. In the independent operation mode, the electric load 10 is switched to the independent output terminal 23, an electric load different from the electric load 10 is connected to the independent output terminal 23 to make it possible to use an electric generation output from the electric generator 1.

Figure 5:
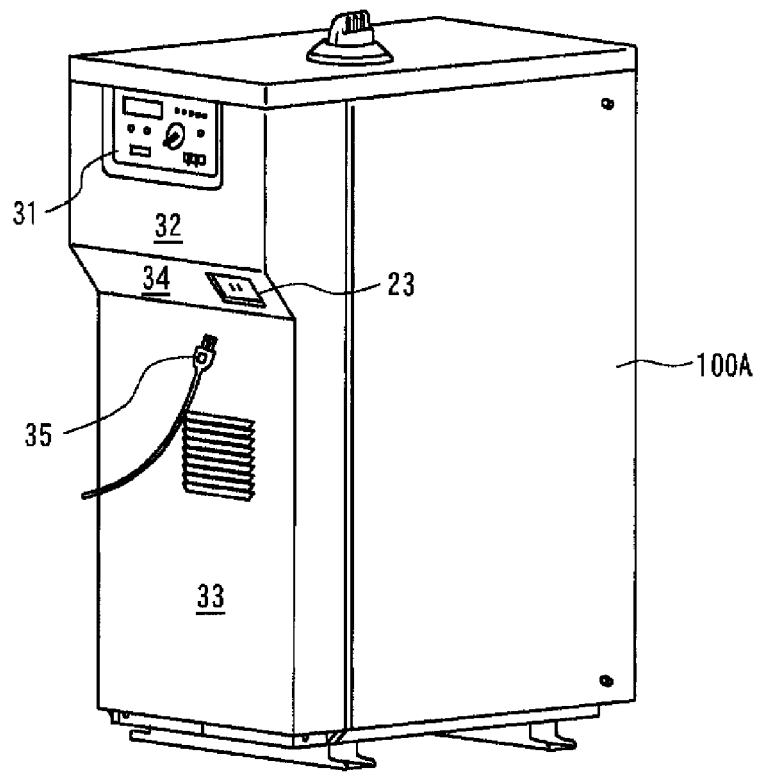
FIG. 5 is an external perspective view of a cogeneration apparatus.
Figure 6:
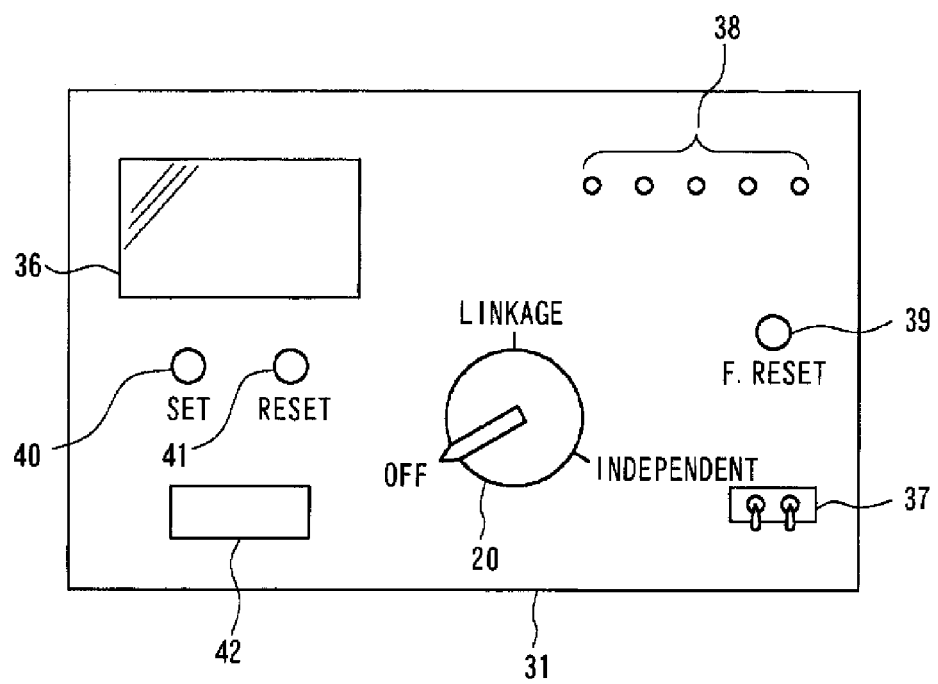
FIG. 6 is an enlarged diagram of a console panel arranged on a cogeneration apparatus according to an embodiment of the present invention.

FIG. 5 is an external perspective view of a cogeneration apparatus. FIG. 6 is an enlarged diagram of a console panel arranged on a cogeneration apparatus according to an embodiment of the present invention. In FIG. 5, a casing 100A of the cogeneration apparatus 100 has a rectangular parallelepiped. In the casing 110A, the main body of the cogeneration apparatus 100 except for the distribution panel 27, wiring extending from the ATS 8 to the distribution panel 27, wiring extending from the distribution panel 27 to the electric load 10 and the power system 9, and the like among the components illustrated in FIG. 2, is housed. A console panel 31 is arranged on an upper front part of the casing 100A. A lower front part of the cogeneration apparatus 100 has a plane 33 which retreats to the rear side of a plane 32 of the upper part. An inclined plane is formed between the plane 32 and the plane 33, and the outlet, that is, the independent output terminal 23 is arranged on the inclined plane 34 such that the independent output terminal 23 is exposed. Since the independent output terminal 23 is downwardly exposed to the inclined plane 34, the independent output terminal 23 has a structure in which dust or water droplet hardly adheres to the independent output terminal 23. A plug 35 connected to the electric load is upwardly inserted into the independent output terminal 23.

The outlet, that is, the independent output terminal 23 may have a drop-proof cover in consideration of outside use. The front plane of the cogeneration apparatus 100 is not necessarily a stepped plane as shown in FIG. 5, and may be planarly formed.

In FIG. 6, an operation switch 20 to select an operation mode is arranged on the console panel 31. The operation switch 20 is constituted by a rotary switch having an off position (OFF), an independent operation mode position (independent), and a system linkage position (linkage). When the operation switch 20 is set at the independent operation mode position, the cogeneration apparatus can be automatically switched to the independent operation mode depending on detection of electricity failure in electricity failure or the like while being operated in the system linkage state. When the operation switch 20 is set at the system linkage position, the cogeneration apparatus can be operated in only the system linkage state, and the operation is stopped in electricity failure. On the console panel 31, in addition to a selection switch 20A, a display screen 36, a gas system setting switch 37, an LED display lamp 38, a trouble reset switch 39, operation condition setting switches 40 and 41 and a USB terminal 42, and the like are arranged.

As described above, the upper limit of the engine rotating speed is made high to make it possible to set the maximum output point higher than that in the system linkage state because of the following technical background. More specifically, the cogeneration apparatus is absolutely demanded to be continuously stably operated for a long period of time, for example, 10 years or more and to attach importance to economical efficiency in operation. Therefore, in order to satisfy the condition, in a normal system linkage operation, the engine E is set to be used at a low rotating speed/low load factor.

On the other hand, it may be assumed that the independent operation is a very-short-period operation used in an emergency state such as electricity failure. Therefore, in the emergency state, the cogeneration apparatus can be operated at a high rotating speed/high load or certainly inefficiently operated without considerably affecting the lifetime of the cogeneration apparatus.

According to the present invention, a compact cogeneration apparatus for household purposes can be effectively utilized as a power supply for an emergency state such as electricity failure.

The invention claimed is:

1. A cogeneration apparatus having an engine, an electric generator driven by the engine, a system linkage control unit which links an electric power generation output from the electric generator with a power system, and an exhaust heat recovery unit which recovers exhaust heat from the engine, comprising:
    means for raising an upper limit of a rotating speed of the engine to an upper limit higher than that in a system linkage state to enable to perform an operation at a raised maximum output point of the electric generator in an independent operation state in which the cogeneration apparatus is operated independently of the system, said means comprises:
    means for supplying a signal that corresponds to a value higher than the upper limit in the system linkage state to a stepping means, said stepping means controls the rotating speed of the electric generator in the independent operation state to said value.

2. The cogeneration apparatus according to claim 1, further comprising:
    an electricity failure detecting means for the system, and a control means for switching the operation to the independent operation in response to detection of electricity failure by the electricity failure detection means and releasing the system linkage.

3. The cogeneration apparatus according to claim 1 or 2, characterized in that the engine is started when the engine is unoperated in electricity failure in the power system.

\* \* \* \* \*